United States Patent
Arthur et al.

(10) Patent No.: US 7,822,640 B2
(45) Date of Patent: Oct. 26, 2010

(54) MULTI-CARD BULK PACKAGE IDENTIFYING ACTIVATION SYSTEMS AND METHODS

(75) Inventors: Steven E. Arthur, Castle Rock, CO (US); Bret M. Esslinger, Weston, FL (US)

(73) Assignee: First Data Corporation, Greenwood Village, CO (US)

( * ) Notice: Subject to any disclaimer, the term of this patent is extended or adjusted under 35 U.S.C. 154(b) by 553 days.

(21) Appl. No.: 11/419,413

(22) Filed: May 19, 2006

(65) Prior Publication Data

US 2006/0261154 A1 Nov. 23, 2006

Related U.S. Application Data

(63) Continuation-in-part of application No. 10/696,014, filed on Oct. 28, 2003.

(51) Int. Cl.
*G06Q 20/00* (2006.01)
(52) U.S. Cl. .......................... 705/17; 235/379
(58) Field of Classification Search ................ 235/375, 235/379, 380, 381, 486, 492, 376; 379/91, 379/144; 705/1, 32, 41, 10, 14, 16, 23
See application file for complete search history.

(56) References Cited

U.S. PATENT DOCUMENTS

| | | | |
|---|---|---|---|
| 4,554,446 A | 11/1985 | Murphy et al. | |
| 5,200,889 A | 4/1993 | Mori | |
| 5,220,501 A | 6/1993 | Lawlor et al. | |
| 5,256,863 A | 10/1993 | Ferguson et al. | |
| 5,555,496 A | 9/1996 | Tackbary et al. | |
| 5,696,908 A | 12/1997 | Muehlberger et al. | |
| 5,699,528 A | 12/1997 | Hogan | |
| 5,757,917 A | 5/1998 | Rose et al. | |
| 5,774,879 A | 6/1998 | Custy et al. | |
| 5,777,305 A * | 7/1998 | Smith et al. ................. | 235/380 |
| 5,826,241 A | 10/1998 | Stein et al. | |

(Continued)

FOREIGN PATENT DOCUMENTS

EP 911772 4/1999

(Continued)

OTHER PUBLICATIONS

Francella, Barbara Grondin, Prepared for prepaid: retailers look to new technologies for handling exploding Nov. 19, 2001, Convenience Store News, v 37, n. 14, p. 31(4).*

(Continued)

*Primary Examiner*—Matthew S Gart
*Assistant Examiner*—Rokib Masud
(74) *Attorney, Agent, or Firm*—Townsend and Townsend and Crew LLP

(57) ABSTRACT

According to one embodiment of the invention, a method of activating a plurality of gift cards utilizes a package of multiple presentation instruments. Each presentation instrument includes a unique presentation instrument identifier used to associate funds with the presentation instrument. Also, the package includes a package identifier. In one step, the package identifier is read from the package and is transmitted over an electronic network to a host computer system which evaluates the package identifier to determine whether the package identifier is valid. If so, each of the presentation instruments in the package is activated for a certain activation amount.

18 Claims, 13 Drawing Sheets

U.S. PATENT DOCUMENTS

| | | | |
|---|---|---|---|
| 5,832,458 A | 11/1998 | Jones | |
| 5,899,980 A | 5/1999 | Wilf et al. | |
| 5,905,246 A | 5/1999 | Fajkowski | |
| 5,923,016 A | 7/1999 | Fredregill et al. | |
| 5,960,412 A | 9/1999 | Tackbary et al. | |
| 5,987,140 A | 11/1999 | Rowney et al. | |
| 5,987,429 A | 11/1999 | Maritzen et al. | |
| 5,991,750 A | 11/1999 | Watson | |
| 5,999,625 A | 12/1999 | Bellare et al. | |
| 6,000,608 A * | 12/1999 | Dorf | 235/380 |
| 6,012,045 A | 1/2000 | Barzilai et al. | |
| 6,012,048 A | 1/2000 | Gustin et al. | |
| 6,032,133 A | 2/2000 | Hilt et al. | |
| 6,044,363 A | 3/2000 | Mori et al. | |
| 6,058,379 A | 5/2000 | Odom et al. | |
| 6,058,417 A | 5/2000 | Hess et al. | |
| 6,070,798 A | 6/2000 | Nethery | |
| 6,073,117 A | 6/2000 | Oyanagi et al. | |
| 6,088,684 A | 7/2000 | Custy et al. | |
| 6,098,053 A | 8/2000 | Slater | |
| 6,119,106 A | 9/2000 | Mersky et al. | |
| 6,122,625 A | 9/2000 | Rosen | |
| 6,167,386 A | 12/2000 | Brown | |
| 6,175,823 B1 | 1/2001 | Van Dusen | |
| 6,226,623 B1 | 5/2001 | Schein et al. | |
| 6,246,996 B1 | 6/2001 | Stein et al. | |
| 6,308,887 B1 | 10/2001 | Korman et al. | |
| 6,336,099 B1 | 1/2002 | Barnett et al. | |
| 6,473,500 B1 * | 10/2002 | Risafi et al. | 379/144.01 |
| 6,847,935 B1 | 1/2005 | Solomon et al. | |
| 6,957,737 B1 | 10/2005 | Frederickson et al. | |
| 7,006,983 B1 | 2/2006 | Packes et al. | |
| 7,028,896 B2 * | 4/2006 | Goldstein et al. | 235/436 |
| 2001/0047342 A1 | 11/2001 | Cuervo | |
| 2002/0049669 A1 | 4/2002 | Bleser et al. | |
| 2002/0152116 A1 | 10/2002 | Yan et al. | |
| 2002/0161641 A1 | 10/2002 | Quinlan et al. | |
| 2002/0165795 A1 | 11/2002 | Holley et al. | |
| 2003/0001005 A1 | 1/2003 | Risafi et al. | |
| 2003/0024981 A1 | 2/2003 | Narasimhan | |
| 2003/0053609 A1 | 3/2003 | Risafi et al. | |
| 2003/0097331 A1 | 5/2003 | Cohen | |
| 2003/0115126 A1 | 6/2003 | Pitroda | |
| 2003/0150142 A1 | 8/2003 | Street | |
| 2003/0154163 A1 | 8/2003 | Phillips et al. | |
| 2005/0033639 A1 | 2/2005 | Myers | |
| 2005/0091115 A1 | 4/2005 | Arthur | |
| 2006/0261154 A1 | 11/2006 | Arthur et al. | |

FOREIGN PATENT DOCUMENTS

| | | |
|---|---|---|
| EP | 0949596 A2 | 10/1999 |
| EP | 1077436 A2 | 2/2001 |
| WO | WO 0022559 A1 | 4/2000 |
| WO | WO 0034899 | 6/2000 |
| WO | WO 0054122 A2 | 9/2000 |
| WO | WO 0067177 | 11/2000 |
| WO | WO 0079452 | 12/2000 |
| WO | WO 0104816 | 1/2001 |
| WO | WO 0141419 | 6/2001 |

OTHER PUBLICATIONS

Amerinet, Inc., "Debit-It!—The Best Idea In Payment Systems Since the Credit Card", downloaded from website http://www.debit-it.com/ on Feb. 7, 2000, 8 pages.

Confinity, Inc., PayPal.com, How PayPal.com Works, download from website http://www.paypal.com on Feb. 7, 2000, 7 pages.

Dotbank, "The Wat to Send and Receive Money on the Internet," download from website http://www.dotbank.com, Feb. 7, 2000, 6 pages.

Idealab Company, "PayMe.com," download from website http://ssl.idealab.com on Feb. 16, 2000, 7 pages.

Intell-A-Check Corp.: "Intell-A-Check!—The Way to get Paid", Intell-A-Check product overview, retrieved from http://www.icheck.com/ on Feb. 7, 2000, 7 pages.

TeleCheck International, Inc.: "Making Checks Our Responsibility", retrieved from http://www.telecheck.com/home/home.html on Feb. 7, 2000, 8 pages.

Telecheck, Verification Services, Internet, http://telecheck.com, Feb. 7, 2000.

The Denver Post, Apr. 1, 2000, "Rebate Quests Often Result in Unhappy Returns".

Transpoint, "The Way to Pay Online", downloaded from website http://www.transpoint.com/ on Feb. 10, 2000, 12 pages.

PCT International Search Report and Written Opinion mailed Jan. 27, 2009; International Application No. PCT/US2008/072638, 11 pages.

* cited by examiner

MULTI-CARD BULK PACKAGE IDENTIFYING ACTIVATION SYSTEMS AND METHODS

CROSS-REFERENCES TO RELATED APPLICATIONS

This application is a continuation in part application and claims the benefit of copending U.S. application Ser. No. 10/696,014, filed Oct. 28, 2003, the complete disclosure of which is herein incorporated by reference.

BACKGROUND OF THE INVENTION

Some embodiments of this invention relate generally to cards for purchasing items, such as at point-of-sale devices. In particular, some embodiments of the invention relate to gift cards. In one particular embodiment, the invention relates to purchasing an activating multiple presentation instruments at the same time, e.g. with a single activation transaction.

One convenience item that is commonly purchased at point-of-sale devices is the gift card. Gift cards are often displayed at point-of-sale devices such as at supermarket checkout stands or restaurant cashier stands. In the typical setting, a consumer will purchase one or two gift cards at a time. These gift cards are often activated by swiping them at the checkout stand at which point the card number is referred to a computer which activates the card's account.

However, there are some purchasers who desire to purchase a large quantity of gift cards at a single time. For example, a corporate entity may desire to purchase a large number of cards as rewards for its employees. Similarly, a consumer may desire to purchase a large number of gift cards and sell them at a discount to others. Thus, there is a portion of the consuming public that actually purchases a large number of cards at a single checkout.

As a result of this, it can severely delay the checkout process if the cashier is required to swipe all of the cards being purchased. For example, a cashier may have to swipe 100 individual cards which are then activated and confirmed. The resulting delay can severely hamper the progression of consumers through the checkout lines at a store.

Similarly, there is a need for a packaging system that allows a purchaser to conveniently purchase a bulk amount of cards without the necessity of physically counting the individual cards. Again, since these cards are often purchased at the checkout lane, a delay can be incurred if the consumer is required to count out the number of cards that he or she desires to purchase.

As a result, there is a need for a more efficient mechanism for purchasing a large amount of cards. Furthermore, a packaging system that solves the problem of the current implementation of selling cards is desirable.

BRIEF SUMMARY OF THE INVENTION

According to one embodiment of the invention, a method of activating a plurality of presentation instruments, such as gift cards, at a point-of-sale device is provided by providing a first card number corresponding to a first card in the series of cards; providing a total number of cards to be activated; activating the card corresponding to the first card number; and activating the next successive card in the series corresponding to the next successive card number.

According to another embodiment of the invention, the method of activating more than one gift card at a point-of-sale device is provided by receiving a plurality of cards at a point-of-sale device; entering a first indicator indicative of a first card in the plurality of cards; entering a total number of cards in the plurality of cards; indicating the first indicator and the total number of cards to an activation computer; receiving confirmation that the plurality of cards have been approved for activation.

According to yet another embodiment of the invention, a method of validating the activation of a plurality of cards is provided by receiving from a point-of-sale device an indicator indicative of a first card in the plurality of cards; receiving an indicator indicative of a total number of cards in the plurality of cards; determining whether the plurality of cards can be activated; and indicating a validation signal so as to indicate at the point-of-sale device whether the plurality of cards can be activated.

According to one embodiment of the invention, a packaging system is provided by providing a plurality of cards having sequential card numbers; packaging the plurality of cards in the common package; configuring at least one card number for detection by a bar code scanner; and labeling the package with the total number of cards in the package.

Similarly, another method of packaging cards according to one embodiment of the invention is provided by supplying as a package a plurality of cards, each of the cards having a different respective card number; wherein the card numbers form a sequential order; and providing a package identifier on the package wherein the package identifier comprises an indicator indicating one of the plurality of cards and an indicator indicating the total number of cards in the package for activation.

According to another embodiment of the invention, a method of activating a plurality of gift cards utilizes a package of multiple presentation instruments. Each presentation instrument includes a unique presentation instrument identifier used to associate funds with the presentation instrument. Also, the package includes a package identifier. In one step, the package identifier is read from the package and is transmitted over an electronic network to a host computer system which evaluates the package identifier to determine whether the package identifier is valid. If so, each of the presentation instruments in the package is activated for a certain activation amount.

Conveniently, the package identifier may be read electronically at a point of sale device using a reader. Such readers may include a bar code reader, a magnetic stripe reader, an RF reader and the like. Such readers may also be used to read the presentation instrument identifiers and then transmit the identifiers to the host computer system.

In one aspect, the host computer system may be associated with a database that includes package identifiers and presentation instrument identifiers that are associated with the package identifiers. In this way, the presentation instruments may be activated by flagging those presentation instrument identifiers that are associated with the package identifier that was read from the package. In another aspect, a purchase amount for the package may be transmitted to the host computer system which evaluates the purchase amount and validates the activation if it is the correct amount. In some cases, at least some of the presentation instruments may be activated for different activation amounts.

Once activated, the presentation instruments may be separated from the package and used to make purchases, also referred to redemption transactions. For example, one of the presentation instrument identifiers may be read with a point of sale device when performing a redemption transaction. The presentation instrument identifier may be transmitted to the host computer system along with a requested redemption amount. The activation amount may then be reduced by the redemption amount and a confirmation of the transaction transmitted back to the point of sale device.

In a further embodiment, the invention provides a presentation instrument package arrangement that comprises a plurality of presentation instruments that each have an account identifier stored thereon. The account identifiers are associated with stored value accounts maintained on a host computer system. The package arrangement further includes packaging material used to secure the presentation instruments together. Also, a package identifier is associated with the packaging material and is readable by a point of sale device to activate each of the presentation instruments at the host computer system.

In one aspect, the presentation instruments comprise plastic cards, and the account identifiers may be stored on media such as bar codes, magnetic stripes, RF chips and the like. In another aspect, the packaging material may be a material such as shrink wrap, card board, paper, and the like. Also, the package identifier may be stored on media such as bar codes, RF chips and the like.

In one particular embodiment, the invention provides a system for activating of a plurality of presentation instruments. The system includes a host computer system having a record of a group of account identifiers, activation amounts for each of the account identifiers and a group identifier that is associated with the group of account identifiers. The system also includes a package arrangement comprising a plurality of presentation instruments that each have a presentation instrument identifier stored thereon, packaging material used to secure the presentation instruments together, and a package identifier associated with the packaging material. The host computer system is configured to receive the package identifier from a point of sale device, to compare the package identifier with the group identifier and to activate each of the presentation instruments that are associated with the group identifier.

In some cases, the account identifier and the associated presentation instrument identifiers may be the same or different. Also, activation amounts may be associated with each of the account identifiers. In this way, the host computer system may receive a purchase amount for the package arrangement and to activate the associated presentation instruments if the activation amount equals the purchase amount for all of the account identifiers associated with the package. In some cases, at least some of the activation amounts are different from each other. As such a package may be sold with presentation instruments of different value.

The system may further include at least one point of sale device that is configured to read the package identifier and to transmit the package identifier to the host computer system. The point of sale device may include a reader such as a bar code reader, a magnetic stripe reader, an RF reader or the like.

As another feature, the point of sale device may be used to read the presentation instrument identifier from the presentation instrument and to transmit the presentation instrument identifier to the host computer system In this way, funds may be debited from the account when making purchases or added to the account when performing a reload transaction.

Further embodiments of the invention will be apparent to those of ordinary skill in the art from a consideration of the following description taken in conjunction with the accompanying drawings, wherein certain methods, apparatuses, and articles of manufacture for practicing the embodiments of the invention are illustrated.

DETAILED DESCRIPTION OF THE INVENTION

Figure 7:
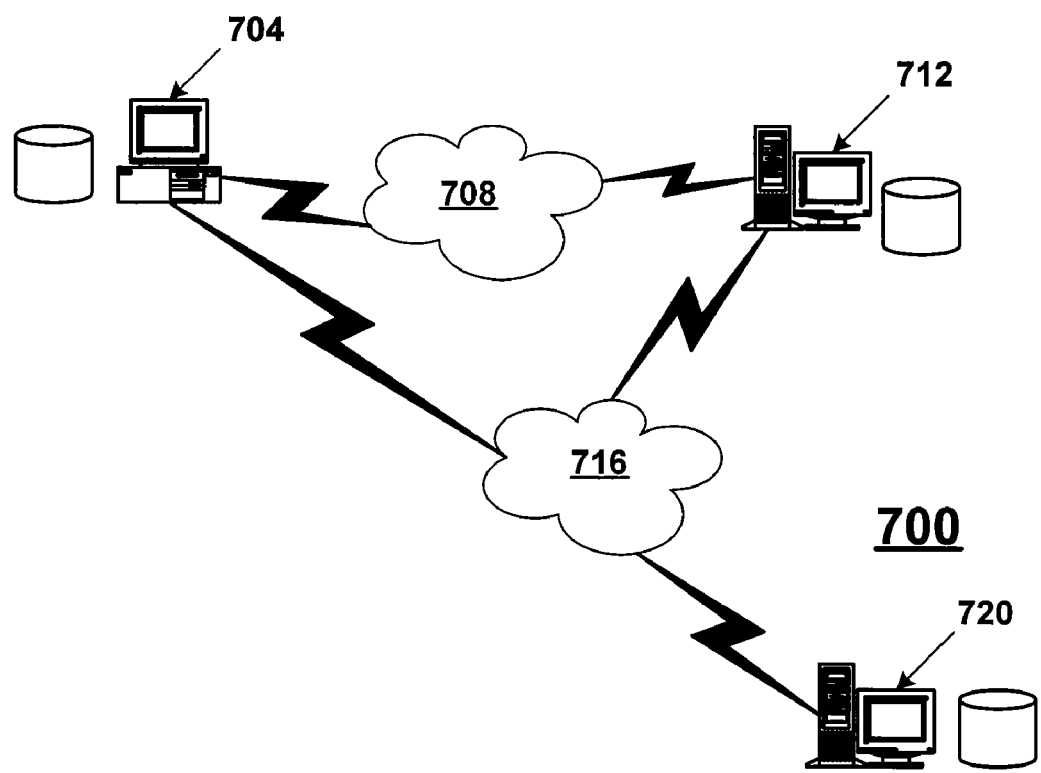
FIG. 7 illustrates a system for activating a plurality of cards according to one embodiment of the invention.

Referring now to FIG. 7, a system for implementing an embodiment of the invention can be seen. FIG. 7 illustrates a system 700 which is comprised of a point-of-sale device 704, a validation computer system 712, and an activation computer database 720. In one sense, validation computer system 712 and activation computer database may be referred to as a host computer system that is used both to activate multiple presentation instruments at the same time, as well as to perform redemption and reload transactions for already purchased presentation instruments. The various systems are coupled by networks 708 and 716 in FIG. 7. However, it should be noted that a variety of coupling systems could be used to interlink the various computer systems for purposes of this embodiment of the invention.

In FIG. 7, point-of-sale device 704 is coupled with a presentation instrument or card validation computer 712 across network 708. Point-of-sale device 704 may include a reader, such as a bar code reader, magnetic strip reader, an RF or other chip reader and the like. Further, the point of sale device 704 may include a key entry pad, a display screen, a receipt printer and the like as in known in the art. Examples of suitable POS devices are provided in the following commonly assigned applications, the entire disclosures of which are incorporated herein by reference for all purposes: U.S. Prov. Pat. Appl. No. 60/147,889, entitled "Integrated Point Of Sale Device," filed Aug. 9, 1999 by Randy J. Templeton et al.; U.S. patent application Ser. No. 09/634,901, entitled "Point Of Sale Payment System," filed Aug. 9, 2000 by Randy J. Templeton et al.; U.S. patent application Ser. No. 10/116,689, entitled "Systems And Methods For Performing Transactions At A Point-Of-Sale," filed Apr. 3, 2002 by Earney Stoutenburg et al.; U.S. patent application Ser. No. 10/116,733, entitled "Systems And Methods For Deploying A Point-Of-Sale System," filed Apr. 3, 2002 by Earney Stoutenburg et al.; U.S. patent application Ser. No. 10/116,686, entitled "Systems And Methods For Utilizing A Point-Of-Sale System," filed Apr. 3, 2002 by Earney Stoutenburg et al.; and U.S. patent application Ser. No. 10/116,735, entitled "Systems And Methods For Configuring A Point-Of-Sale System," filed Apr. 3, 2002 by Earney Stoutenburg.

The card validation computer system 712 is similarly coupled via network 716 with card activation computer system 720. In one particular embodiment, upon a consumer presenting a large amount of gift cards, for example, at the point-of-sale device 704, a clerk can scan the first card so that a bar code on the card is detected by a bar code reader or alternatively swipe the first card through a magnetic stripe reader if magnetic stripe encoding is used. The card number indicated by the bar code or magnetic stripe is subsequently transmitted across network 708 to the card validation computer 712. Furthermore, the clerk can enter the total number of cards to be purchased at the point-of-sale device. Then this number can be transmitted across network 708, as well, to the card validation system. The card validation system can then determine whether the card which has been presented will likely be capable of being activated.

The card validation computer system 712 performs the function of determining whether the card which has been presented will be activated. Not all cards that are presented will necessarily be capable of being activated. Cards of different type may inadvertently be presented to the cashier for activation where the consumer mistakenly believes they are all of the same type. The validation system is capable of determining whether the cards that have been presented are all of the same type and amount. Similarly, some cards may have already been activated by prior aborted purchases or other means. Therefore, the card validation computer is capable of detecting whether an error would occur for an already activated card. Thus, the card validation computer system 712 operates as a first check to determine whether the cards can all be activated. The actual activation process is a more time-intensive process. Since a significant number of cards can be involved, it is preferred to validate the activation of the cards rather than waiting for all the cards to be activated before signaling back to the point-of-sale device. Nevertheless, in some instances, it may be useful to eliminate the validation act and perform an actual activation before responding to the point of sale (POS).

The card activation computer system 720 provides the actual activation of a card number. Such a card number may appear on a plastic card. Thus, the activation process refers to activating an account referred to by the card number as opposed to activating an actual card itself, e.g., a smart card. Any type of card can be used to provide the card number at the point-of-sale device, e.g., plastic card with bar code, magnetic stripe card, card with numbers written on the card, smartcard, etc. It merely represents the account from which purchase amounts are decremented.

While the validation computer 712 and activation computer system 720 have been described as different computers, alternatively they could be performed by the same computer system. Similarly, network 708 and 716 could be the same network.

Figure 2:
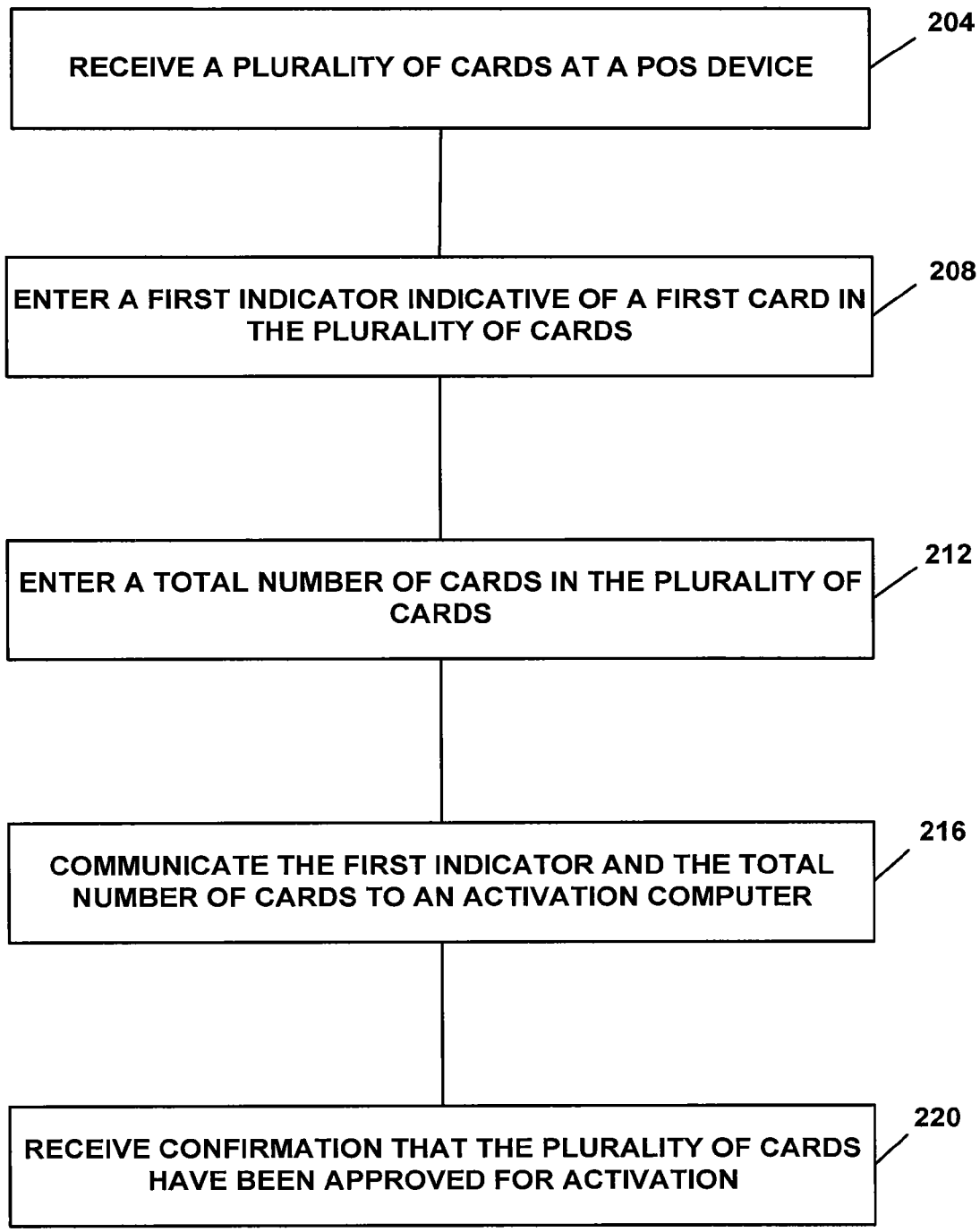
FIG. 2 illustrates a flowchart demonstrating a method for approving activation of a plurality of cards according to one embodiment of the invention.

Referring now to FIG. 2, a method according to one embodiment of the invention will be described. FIG. 2 illustrates a flowchart 200 demonstrating a method for implementing a purchase of a large number of cards, for example, gift cards at a point-of-sale device. In method 200, a consumer presents a plurality of cards at a point-of-sale device. The plurality of cards are received by the clerk in block 204. The clerk can then enter the indicator for the first card which is one of the cards in the pack of cards presented by the consumer. Thus, a first indicator indicative of a first card in the plurality of cards is entered in block 208. The clerk can enter the first card number by swiping the card through the magnetic stripe reader, keying in the card number into the point-of-sale device, scanning a bar code from the card, or other similar means. In block 212, the total number of cards is entered. Again, the clerk can hand key in the total number of cards that are presented. Alternatively, the point-of-sale device can request a confirmation of the last number in the pack of cards. Thus the clerk can either swipe or hand key in the number of the last card that makes up the pack of cards. In this way, a check can be performed that the entered total number of cards is actually correct. This can be accomplished by simple calculation using the first card number and the last card number.

In block 216, the first indicator, which has the card number of the first card, and the total number of cards in the pack of cards are communicated to an activation computer. This can be a direct communication or performed through the validation system, depending on the configuration of the system. In block 220, a confirmation is transmitted confirming whether the plurality of cards have been approved for activation.

Once a consumer presents a group of cards, there may be a change of heart in the purchase decision. At that point, the user can indicate the decision not to purchase the cards to the clerk and the clerk can void the transaction. When a void signal is transmitted, the activation process can either be aborted or, for a completed activation process, voided. A batch number can be used with the information sent from the point-of-sale device to initiate the activation of the cards. Thus, this same batch number can be used by the point-of-sale device to indicate the void of the purchase without having to enter every card number. The batch number serves as a reference number that voids the activation of the associated cards. Consequently, the computer system such as the computer system shown in FIG. 7 can utilize the batch number to initiate and void the activation of the cards by associating the batch number with the data and acts performed in the validation and activation processes. Alternatively, the batch number can originate at the host where it is assigned to a particular purchase of multiple cards. Still, it could be used as described above to void a purchase or to track a set of cards.

Figure 3:
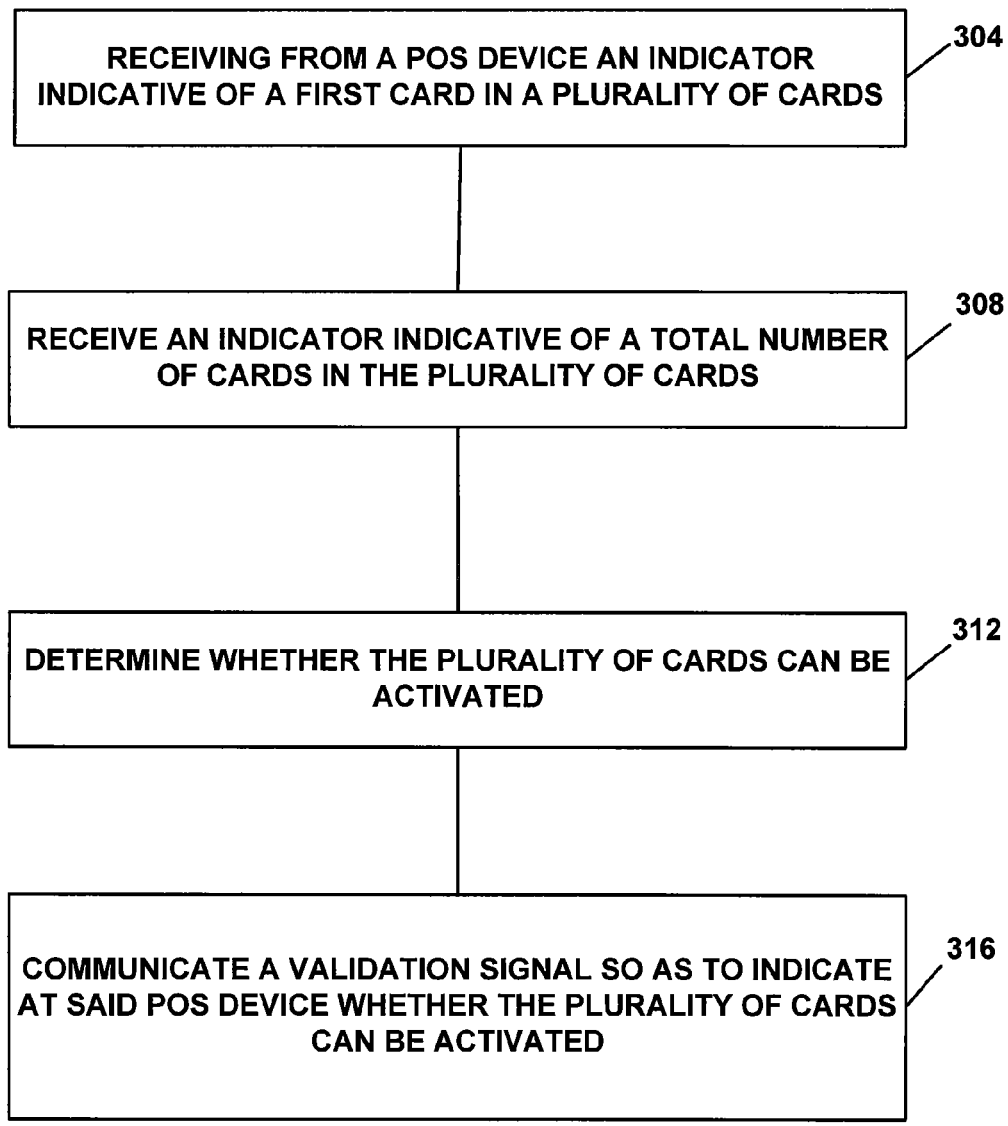
FIG. 3 illustrates a flowchart demonstrating a method of validating activation of a plurality of cards according to one embodiment of the invention.

FIG. 3 illustrates an example of the validation process. Namely, flowchart 300 illustrates a method according to one embodiment for validating whether a plurality of cards can be activated. In block 304, a signal is received at the validation computer from a point-of-sale device comprising an indicator which is indicative of a first card in the pack of multiple cards. In block 308, a second indicator is received which is indicative of the total number of cards in the pack of cards. This second indicator can be coupled with the indicator for the first card so that a single signal is sent to the validation computer. In block 312, a determination is made as to whether the pack (or group) of cards can be activated. Furthermore, in block 316, the result of the validation determination can be communicated by a validation signal so as to indicate at the point-of-sale device whether the plurality of cards in the pack of cards can be activated.

To determine whether the plurality of cards can be activated, a check can be made of the card numbers to confirm that all card numbers are of the same card type and card amount, for example. Thus, if a user presents a group of cards that are for different stores, such as Walmart and Starbucks, the validation procedure can note that the cards are of different types and abort the activation. Similarly, if the first card is for $50 and some of the remaining cards are for $100, the validation process can determine that there is an error and abort the activation of all the cards. Similarly, if a card has previously been activated, the validation process can note that fact and choose whether to activate the remaining cards. One possibility is to abort the entire activation process. However, another possibility is to skip that card and continue activating the remaining cards.

Figure 1:
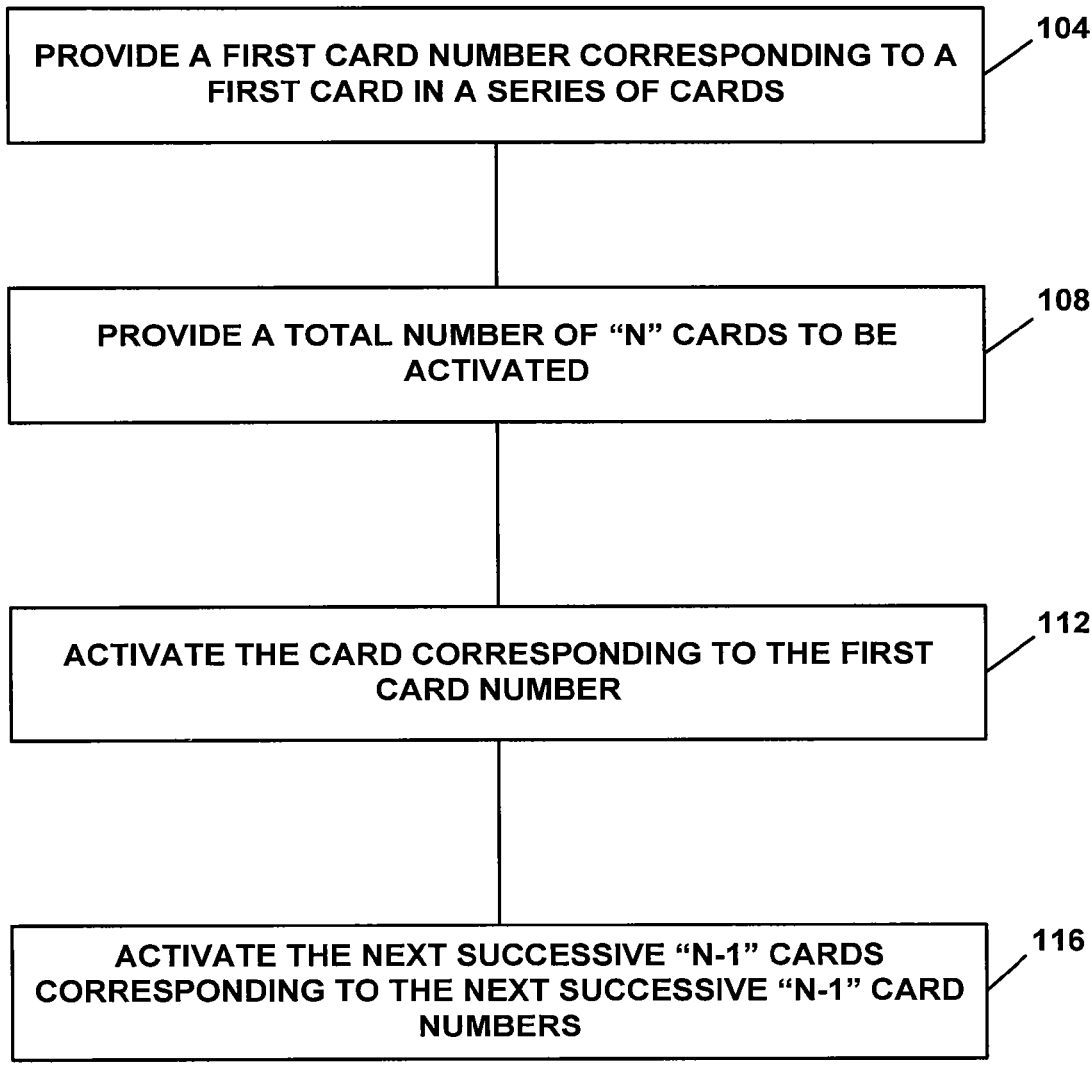
FIG. 1 illustrates a flowchart for implementing a method for activating a plurality of cards according to one embodiment of the invention.

FIG. 1 illustrates a flowchart 100 for implementing a method of activating a pack of cards, according to one embodiment of the invention. In block 104, a first card number corresponding to the first card in the series of cards is provided. Similarly, in block 108, the total number of cards to be activated is provided and illustrated by "N". In block 112, the first card number corresponding to the first card is activated by the activation system. Furthermore, in block 116, the next successive "N-1" cards corresponding to the next successive "N-1" card numbers are activated.

Again, it should be understood that card activation refers to activating the ability of the card to be used in a purchase. It does not require that the card be a device that can be activated, such as a smart card. For example, the card could merely be a plastic card with a number written on the card, a magnetic stripe card, or a card encoded with a bar code. The corresponding account would then be activated to allow purchases to be attributed to the account when the card is presented at the time of purchase. Furthermore, a card number is intended to mean the indicator associated with a particular card. Obviously, such an indicator could be comprised of letters or other indications. Preferably, the card number is a numerical indicator or alphabetical indicator so that successive cards can be easily identified. Of course, a card number might be indicated by bar code, magnetic stripe or the like for easy detection by automated card reading devices.

Figure 4A:
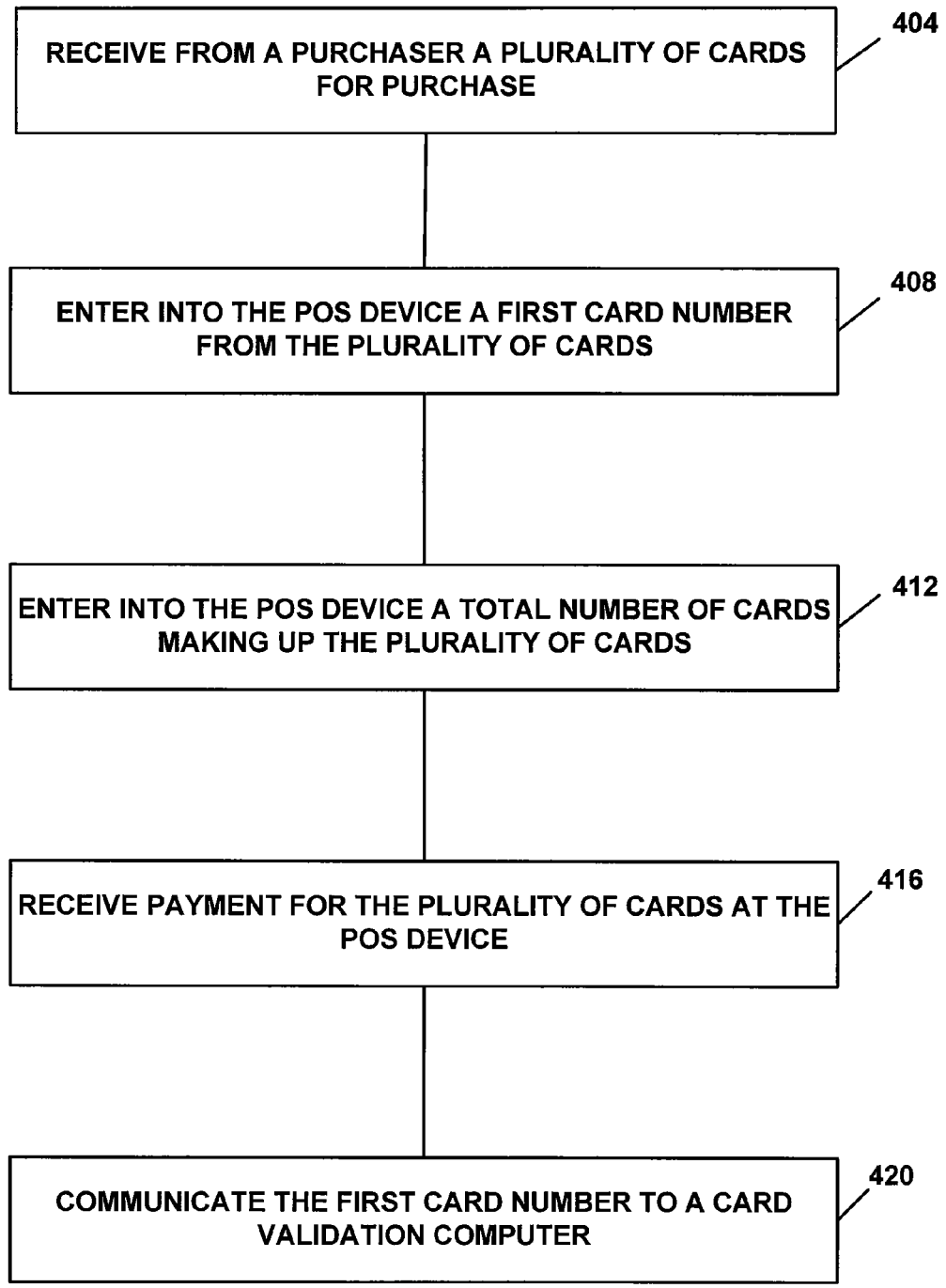
FIGS. 4A, 4B, and 4C illustrate a flowchart 400 for implementing a method for activating a plurality of cards according to one embodiment of the invention.
Figure 4B:
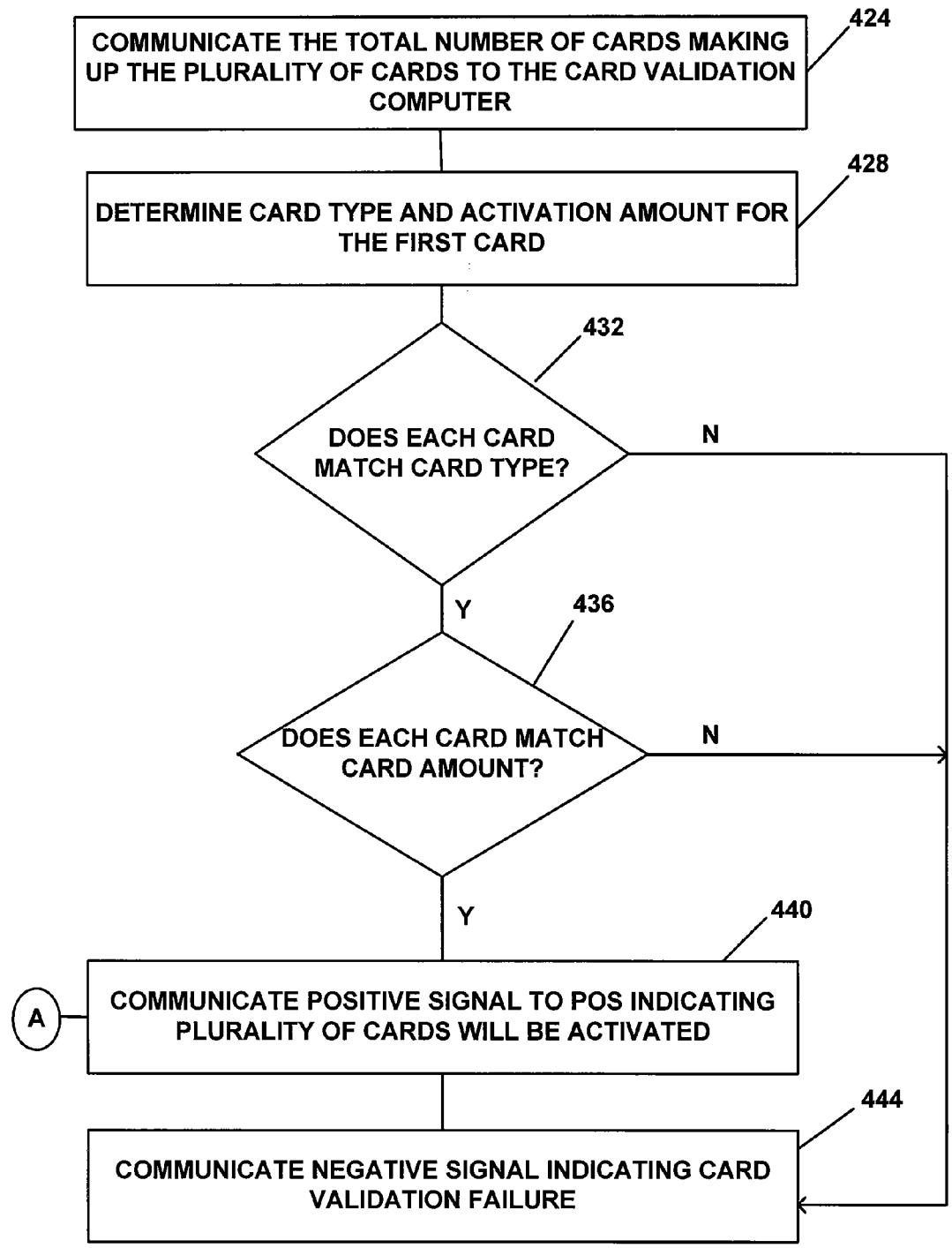
Figure 4C:
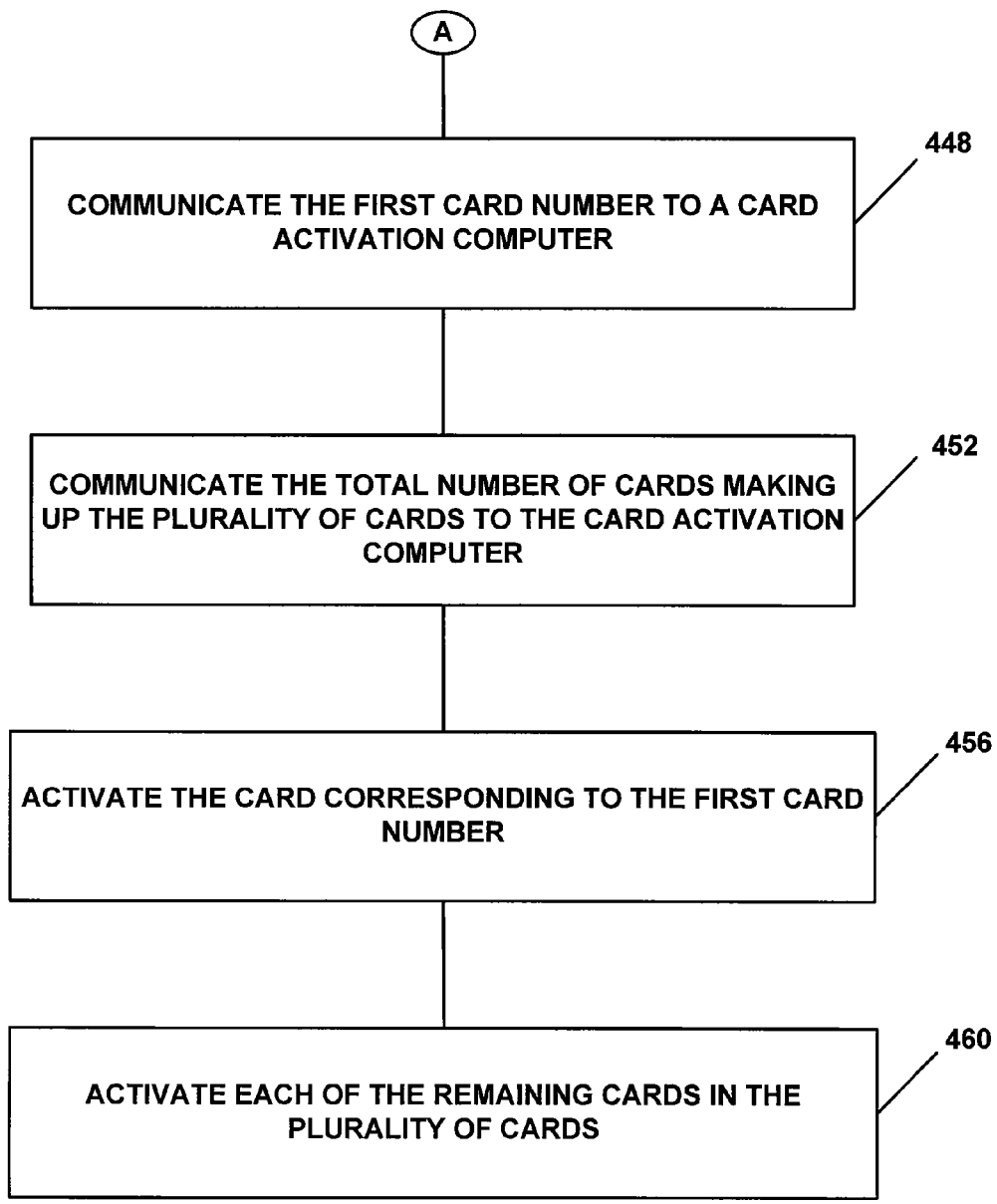

Referring now to FIGS. 4A, 4B, and 4C, a flowchart 400 illustrating a method according to one embodiment of the invention for activating a plurality of cards can be seen. Again, in block 404, a clerk receives from a purchaser a plurality of cards for purchase at a point-of-sale device. The clerk enters into the point-of-sale device the first card number from the plurality of cards as shown in block 408. The clerk can enter the first card number by swiping a first card across a magnetic stripe reader, scanning a bar code on the card, hand keying in the first card number, or using another automated means of entering this number. Furthermore, the clerk can enter into the point-of-sale device a total number of cards that make up the pack for the plurality of cards as shown in block 412. After completing the data entry of the pack of cards and any accompanying items, the clerk can request payment and process payment, as shown in block 416. In FIG. 4A, the point-of-sale device communicates the first card number to a card validation computer. Furthermore, in this example the point-of-sale device indicates the total number of cards making up the pack of cards to the card validation computer as shown in block 424. The validation computer, according to this example, determines the card type and activation amount for the first card as shown in block 428. In decision block 432, the remaining cards in the pack of cards are tested against the card type. For each card, a determination is made as to whether the card type of that card matches the card type of the first card. Thus, for example, a determination can be made as to whether all the cards are for Walmart gift cards. If the card types do not match, the validation computer communicates a negative signal to the point-of-sale device indicating card validation failure which represents the fact that not all the cards can be activated. If such a signal is sent to the point-of-sale device, the clerk can refund the money of the purchaser or retry with a different pack of cards. Similarly, in decision block 436, a second test can be performed to test whether each card matches the card amount of the first card. Again, some cards may be for $50 whereas other cards may be for $100. Therefore, this test confirms that all cards are for the same amount and the purchaser similarly paid the correct amount. Again, if the determination is negative, then a negative signal indicating card validation failure can be sent to the point-of-sale device as mentioned earlier. However, if all cards do satisfy the test criteria, then in block 440, a positive signal can be communicated to the point-of-sale device indicating that the pack of cards will be activated by the activation process. In block 448, the validation computer, according to this example, communicates the first card number to the card activation computer. Similarly, in block 452, the validation computer communicates the total number of cards making up the plurality of cards to the card activation computer. In block 456, the activation system initiates a batch process for activating each individual card by activating the card corresponding to the first card number. Then, in block 460, each of the remaining cards in the plurality of cards is individually activated. Thus, by a single message sent by the point-of-sale device, individual activation of the plurality of cards can take place as opposed to the point-of-sale device sending a plurality of activation requests to the activation system. Therefore, this process facilitates the speed with which a consumer can purchase cards and furthermore decreases the number of signals transmitted to the activation computer system. Thus, the activation computer system can make use of a batch process to implement the activation of a plurality of cards. Furthermore, by validating that the cards can be activated, the cards can be purchased before the activation process is completed. To the purchaser, however, it appears that the activation occurs in real time—even though the cards have only been validated as activatable. It is noted that the activation process need not start with the first card number, but flowchart 400 uses that as a logical example for demonstrating the activation process.

The signal sent from the point-of-sale device to the card validation system can be comprised of the first card number, the total number of cards, or alternatively, the last card number in the pack of cards. Furthermore, a batch number can be generated at the POS device and included as part of the activation request.

Alternatively, a batch number could be created at the validation computer or even the activation computer. Once assigned to a group of cards, the batch number can then be used to void the activation request at a later time in the procedure. Similarly, the batch number can be used for recordkeeping at the validation computer system and the activation computer system for tracking event records at each of those systems. In addition, the batch number can be reported back to the POS device so that the POS device can initiate a void procedure if the consumer decides not to purchase the cards.

The traditional way of selling gift cards in the past has been to present them at checkout stands hanging individually on display hangers. However, with the commercial success of such cards, consumers are now more inclined to purchase the items in bulk. For example, companies now recognize the value of rewarding employees, and gift cards are an easy way to reward a significant number of employees while allowing each employee to choose how to spend the monetary reward to that person's preferred taste. Thus, there is now a need to package the cards in such a way that they can easily be purchased in bulk without the risk of false activation of individual cards.

Figure 5:
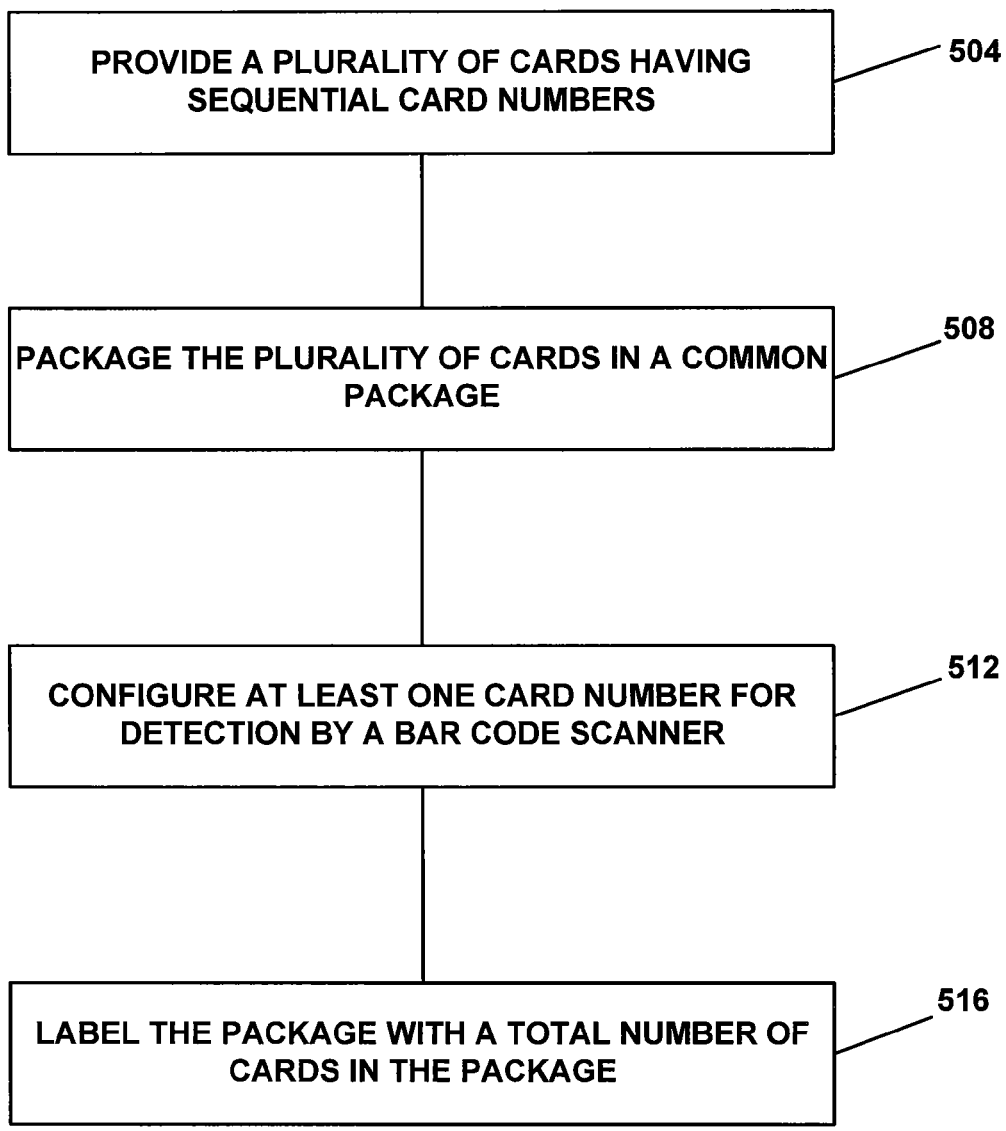
FIG. 5 illustrates a flowchart demonstrating a method for packaging a plurality of cards for activation according to one embodiment of the invention.

One method of doing this is to shrink wrap the cards such that a large sequential number of cards can be packaged together for easy purchase. However, to do so causes the individual card numbers to be obscured such that individual card numbers cannot be seen by the clerk or by a bar code scanner. Thus, one method of overcoming this obstacle is shown in FIG. 5. Namely, FIG. 5 illustrates a flowchart 500 for implementing a method of labeling packages for easy entry by a clerk at a point-of-sale device. In block 504, a plurality of cards are provided having sequential card numbers. In block 508, the plurality of cards are packaged into a common package, such as a shrink wrapped package. In block 512, the cards are configured within the package so that at least one card number can be detected such as by a bar code scanner or viewed by a clerk to hand key in the first card number. Furthermore, the package is also labeled with a total number of cards within the package as shown by block 516. Thus, when the package is presented at the checkout stand, the clerk can scan in the first number and hand key in the total number of cards. Alternatively, the package could be labeled with a bar code indicating the total number of cards that is also scanned in.

Figure 6:
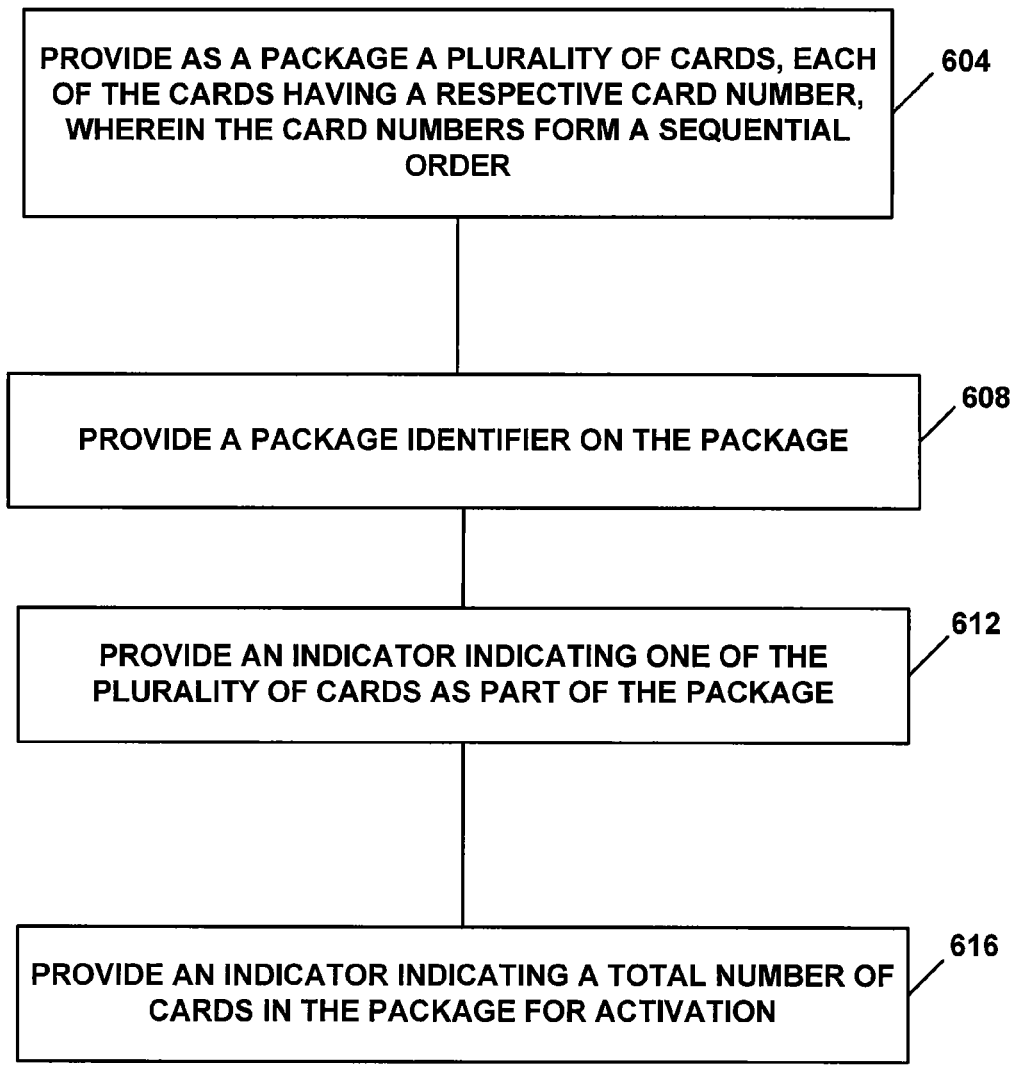
FIG. 6 illustrates a flowchart demonstrating a method for labeling a package of cards according to one embodiment of the invention.

Yet another embodiment of packaging the plurality of cards is shown in FIG. 6 by flowchart 600. In block 604, a plurality of cards are provided as a package. Each card has a respective card number and the card numbers form a sequential order. In block 608, a package identifier is provided on the package. In block 612, an indicator indicating one of the numbers of the plurality of cards is provided as part of the package. Furthermore, in block 616, an indicator indicating a total number of cards is provided as part of the package. Thus, in this alternative embodiment, a shrink wrapped group of cards can be labeled with a single label, for example, which is comprised of a card number and the total number of cards. Thus, when the bar code reader at the point-of-sale device scans the package, it knows not only the card number, but also the total number of cards to be activated. As a result, the algorithm at the validation computer can perform the validation process on the cards indicated by that set of numbers. Normally, this would involve validating the card identified by the card number and subsequent cards; but alternative algorithms could be used.

Another technique for validating multiple presentation instruments at a single time is by packing multiple presentation instruments in a group and providing a package identifier. In this way, when the package identifier is read and transmitted a host, a look up may be performed to determine which presentation instruments are in the package. As such, all presentation instruments in the package may be activated at the same time.

Conveniently, system 700 of FIG. 7 may be used to implement such a process. To do so, database 720 may include a set of package identifiers which are associated with different packages of presentation instruments. Also, database 720 may include a list of presentation instrument identifiers and/or account identifiers for each of the presentation instruments. Further, database 720 may include relational data which ties specific presentation instrument accounts to a specific package. This information may be transmitted to database 720 at the time of manufacture of the presentation instruments. For example, a group of ten presentation instruments may be packaged at a manufacturing location and packaged in a package that is identified by a package identifier. The package identifier along with the ten account identifiers in the package may be transmitted to database 720 to store this information. Also, a value may be associated with each of the account identifiers. For example, each of the ten presentation instruments may have a $50 value. In some cases, the value of each of the presentation instruments may be different, e.g., $25, $50, $100, etc. Database 720 may also include a purchase value for the entire package, which may simply be the sum of the individual presentation instrument values.

To purchase a package of presentation instruments, the identifier on or associated with the package may be read by point of sale device 704 and transmitted to validation computer system 712 which accesses database 720 to ensure that the particular package identifier is valid and perform a check to ensure that the purchase amount sent from the point of sale device 704 is the same as stored in database 720. If so, a confirmation may be sent back to point of sale device 704 which may print a receipt showing activation of each of the presentation instruments in the package. Also, each of the presentation instruments in the package are flagged as active in database 720 and may now be used to make purchases, also referred to as redemptions.

After activation, any one of the presentation instruments in the package may be used to make purchases by reading the account identifier from the presentation instrument using point of sale device 704 which transmits the purchase price and the account identifier to validation computer system 712. In turn, system 712 accesses database 720 to ensure that the account is active and has sufficient funds to cover the purchase. If so, the account is debited by the purchase amount and receipt information is transmitted back to point of sale device 704 where a receipt may be generated. Funds may be added to an account in a similar manner.

Figure 8A:
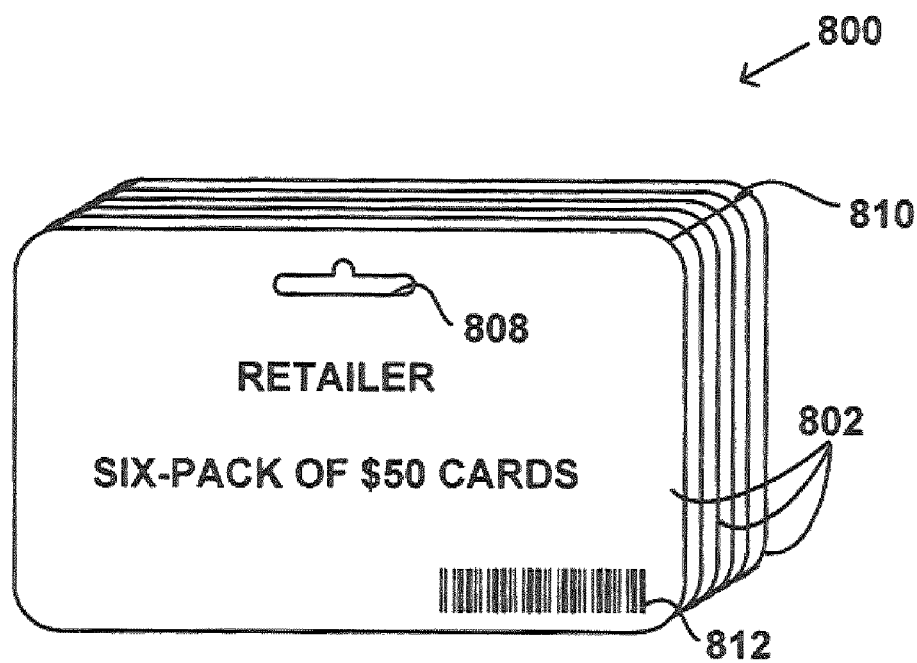
FIG. 8A is a front perspective view of a package of presentation instruments according to the invention.
Figure 8B:
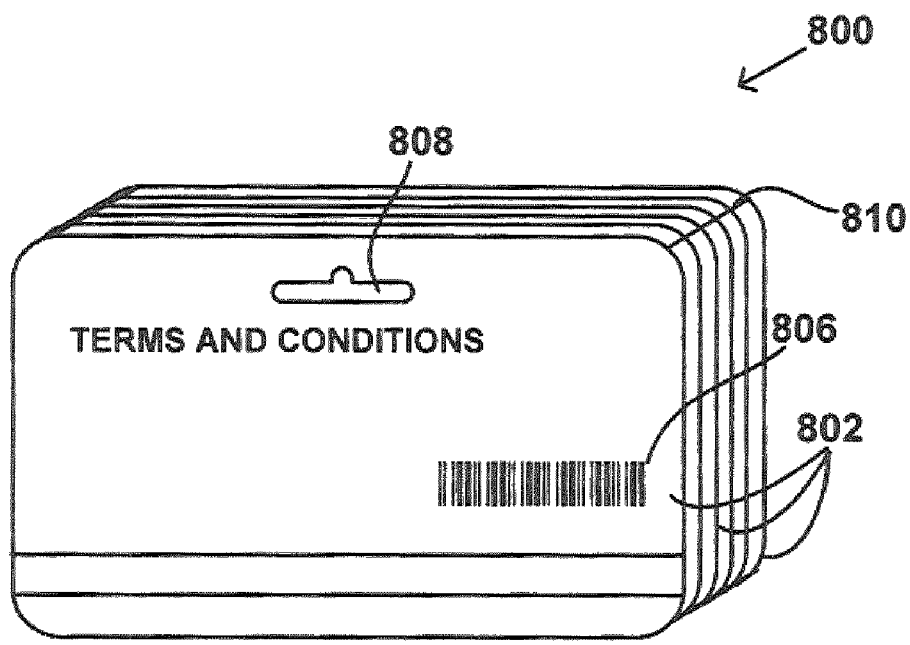
FIG. 8B is a rear perspective view of the package of FIG. 8A.

Referring now to FIGS. 8A and 8B, one embodiment of a package 800 of presentation instruments 802 will be described. As shown, package 800 includes six presentation instruments 802; however, it will be appreciated that any number may be packaged together. As best shown in FIG. 8B, each presentation instrument 802 includes a magnetic stripe 804, upon which is stored a unique presentation instrument identifier or account identifier. This number is used to associate a value with the presentation instrument at the host computer system. Alternatively, or in addition to, a bar code 806 may be used to store the presentation instrument identifier. Although not shown, presentation instrument 802 could also include a RF chip or other electronic storage device for storing the account number. Presentation instruments 802 may be constructed of a variety of materials, such as plastic, card stock and the like and may have essentially any shape, although one particular shape is similar to a CR-80 sized credit card. Presentation instruments 802 may also include other information, such as the name of the merchant, terms and conditions, advertising information and the like.

Optionally, presentation instruments 802 may include a through hole 808 that permits package 800 to be hung from a J-hook or other holding device at a point of sale location. Alternatively, no through hole may be provided, and package 800 may simply be placed on a shelf.

Package 800 further includes a shrink wrap material 810 which holds presentation instruments together as a package. Material 810 may be transparent or opaque and may be removed from the cards by tearing it away. Other kinds of materials that could be used include cardboard or plastic containers, ties, string or the like. Once package 800 is purchased, material 810 may be removed so that presentation instruments may be used as is known in the art.

Included on material 810 is a bar code 812 which includes a package identifier. This identifier is used by the host computer system to identify which presentation instruments are included in the package. The bar code may comprise a stock keeping unit (SKU) which can be scanned by a point of sale device and also used for inventory purposes. Although shown stored as a bar code, other storage schemes may be used.

Figure 9:
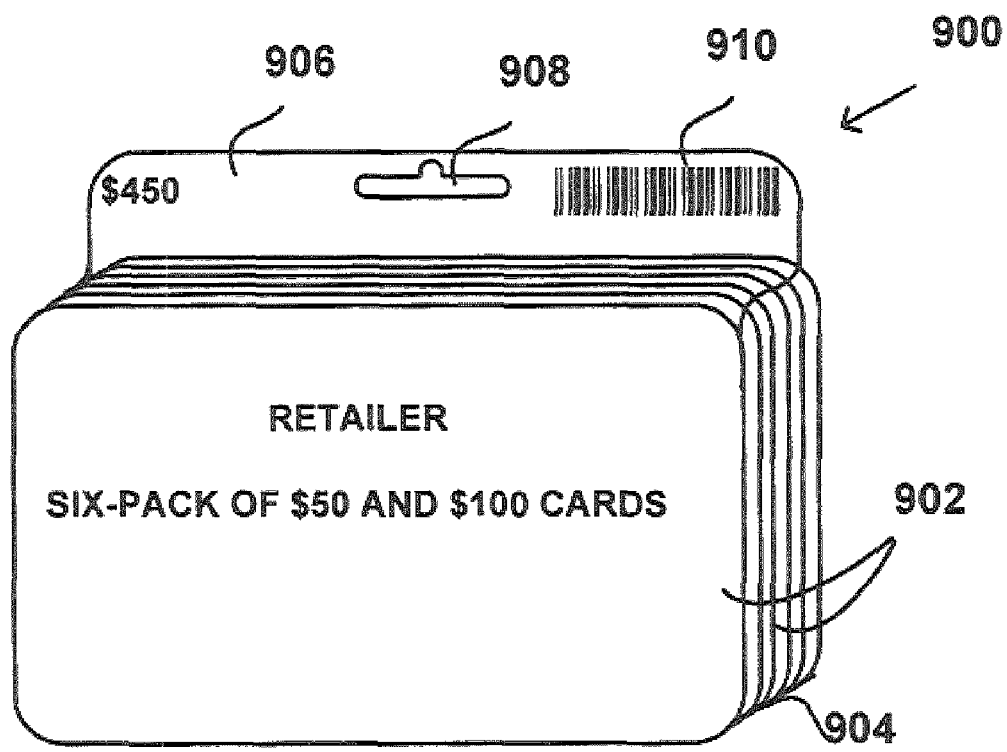
FIG. 9 is a front perspective view of another embodiment of a package of presentation instruments according to the invention.

FIG. 9 illustrates another package 900. Package 900 includes a set of presentation instruments 902 which may be similar to presentation instruments 802 except that presentation instruments 902 may be of different denominations. For example, three of the presentation instruments may have a value of $100 while three may have a value of $50. In this way, the total purchase price of $450. This information may be stored in the host computer.

Package 900 also includes packaging which is constructed of a clear plastic 904 coupled to a piece of card stock 906. In turn, card stock 906 includes a through hole 908 that permits package 900 to be hung from a J-hook at a point of sale location. Also, a bar code 910 may be placed on package 900 and includes a package identifier which may be used by the host computer to activate the presentation instruments in a manner similar to that previously described.

Figure 10:
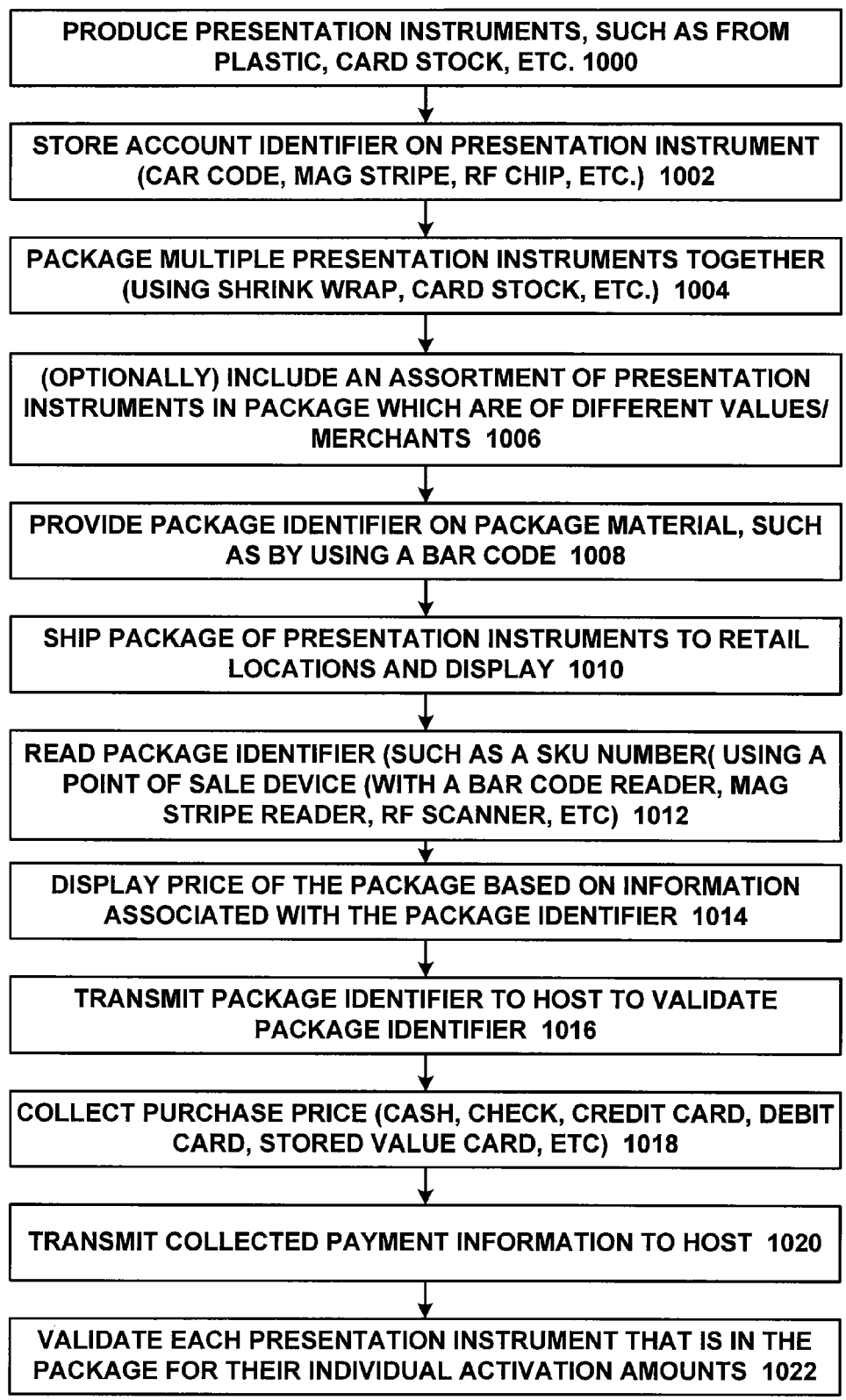
FIG. 10 is a flow chart illustrating one method for activating multiple presentation instruments according to the invention.

Referring now to FIG. 10, one method for activating multiple presentation instruments will be described. Initially, an assortment of presentation instruments are produced (step 1000). This may be from plastic, card stock, or the like. The presentation instruments are initialized by including an account identifier (step 1002). This may be done on a bar code, in text, on a mag strip, on a RF chip or the like. A group of presentation instruments are packaged together (step 1004) as a package. This may be done with shrink wrap, plastic, card stock, other containers or the like. Optionally, the presentation instruments may all be of the same value or different values. Also, the presentation instruments may all be redeemable at the same merchant or with an assortment of merchants (step 1006). In step 1008, a package identifier is provided on the package material. This may be done by bar code, text, mag stripe, chip or the like. The package identifier and account identifiers for each of the presentation instruments in the package may be stored in a database along with a value for each of the presentation instruments.

Once packaged, the package may be shipped to a retail location where it will be displayed for sale (step 1010). When sold, the package identifier is read (which may be a SKU number) using a point of sale device (step 1012). Once read, the point of sale device may display a price of the package which is obtained from the package identifier. This information may be obtained from a local store database (step 1014). The package identifier is also transmitted to a host computer system to validate the package identifier (step 1016). The host computer performs a look up to ensure the package identifier is included in its records. If so, the merchant may collect the purchase price using any payment vehicle, such as cash, check, credit card, debit card, stored value card, etc. (step 1018). The collected payment information is transmitted to the host (step 1020). The host then validates each presentation instrument in the package for its particular value (step 1022). As such, the presentation instruments may now be used to make purchases or to add value to the accounts.

Figure 11:
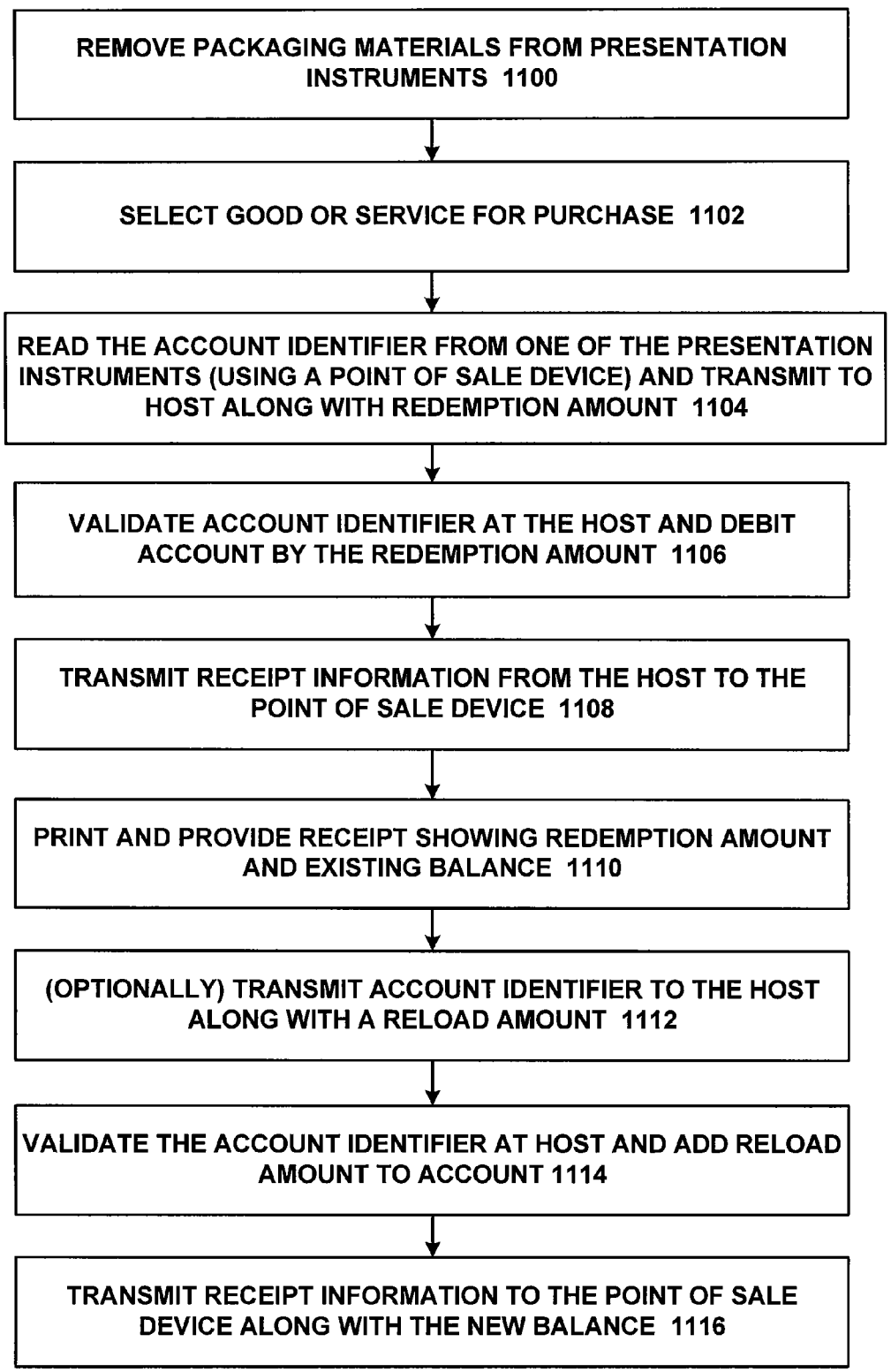
FIG. 11 is a flow chart illustrating one method for using a presentation instrument from a package to make a purchase or to add funds to the account.

FIG. 11 illustrates a method for using a presentation instrument, once a package is purchased. The packaging is removed to expose the presentation instruments as shown in step 1100. A good or service is selected (step 1102) and rung up for purchase. The account identifier is read from the presentation instrument using a point of sale device and transmitted to the host computer along with a redemption amount (step 1104). The host computer validates the account and debits the account by the redemption amount (step 1106). Receipt information is transmitted from the host back to the point of sale device (step 1108). The point of sale device may then print a receipt showing the redemption amount and the current balance (step 1110).

In some cases, funds may be added to an account. This may be done by reading the account identifier from the presentation instrument and transmitting it to the host along with a reload amount (step 1112). The account identifier is validated at the host and the reload amount is added to the account (step 1114). Receipt information may be transmitted from the host to the point of sale device along with the new balance (step 1116). The point of sale device may then print the receipt.

While various embodiments of the invention have been described as methods or apparatus for implementing the invention, it should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments of the invention also be considered protected by this patent in their program code means as well.

It is also envisioned that embodiments of the invention could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures, materials, and acts recited herein can be recited as means for performing a function or steps for performing a function. Therefore, it should be understood that such language is entitled to cover all such structures, materials, or acts disclosed within this specification and their equivalents.

It is thought that the apparatuses and methods of the embodiments of the present invention and its attendant advantages will be understood from this specification. While the above is a complete description of specific embodiments of the invention, the above description should not be taken as limiting the scope of the invention as defined by the claims.

What is claimed is:

1. A method of activating a plurality of gift cards, said method comprising:

providing a package of multiple presentation instruments, wherein each presentation instrument includes a unique presentation instrument identifier used to associate funds with the presentation instrument such that each presentation instrument has a separate independent account, yet is processed by a common processor, wherein each separate account may be activated for a predetermined activation amount, wherein at least some of the accounts have different values associated therewith, wherein the presentation instrument identifiers and associated account values are stored within a database of a host computer system prior to activation of any of the accounts, and wherein the package includes a package identifier, and each such presentation instrument identifier is associated with the package identifier;

reading the package identifier from the package and transmitting the package identifier over an electronic network to the host computer system;

generating a batch number contemporaneous with or subsequent to transmitting the package identifier to the host computer system;

associating the batch number with the package of presentation instruments at the host computer system;

evaluating the package identifier at the host computer system to determine whether the package identifier is valid; and activating at the host computer system each of the presentation instruments in the package for the activation amount based on the package identifier that was read from the package.

2. The method as described in claim 1, wherein the package identifier is read electronically at a point of sale device using a reader selected from a group consisting of a bar code reader, a magnetic stripe reader and an RF reader.

3. The method as described in claim 1, wherein the host computer system includes a database that includes package identifiers and presentation instrument identifiers that are associated with the package identifiers, and wherein the presentation instruments are activated by flagging those presentation instrument identifiers that are associated with the package identifier that was read from the package.

4. The method as described in claim 1, further comprising transmitting to the host computer system a purchase amount and validating at the host computer system the activation amount.

5. The method as described in claim 1, further comprising removing one of the presentation instruments from the package, reading the presentation instrument identifier from the removed presentation instrument with a point of sale device when performing a redemption transaction, and transmitting the presentation instrument identifier to the host computer system along with a requested redemption amount.

6. The method as described in claim 5, further comprising reducing the activation amount by the redemption amount and transmitting a confirmation of the transaction to the point of sale device.

7. The method of claim 1, further comprising transmitting the batch number from the host computer system to a point of sale device to initiate a void procedure to void the activation.

8. A system for activating of a plurality of presentation instruments, the system comprising:

a host computer system having a record of a group of account identifiers, activation amounts for each of the account identifiers and a group identifier that is associated with the group of account identifiers, wherein at least some of the account identifiers have different activation amounts associated therewith, wherein the account identifiers and associated activation amounts are stored within a database of the host computer system prior to activation of any of the accounts; and a package arrangement comprising a plurality of presentation instruments that each have a presentation instrument identifier stored thereon, packaging material used to secure the presentation instruments together, and a package identifier associated with the packaging material, wherein each presentation instrument has a separate independent account, yet is processed by a common processor, and wherein each separate account may be activated for a predetermined activation amount, wherein the packaging material comprises a plastic material that envelops and secures the presentation instruments together;

wherein the host computer system is configured to receive the package identifier that is associated with the presentation instrument identifier from a point of sale device, to compare the package identifier with the group identifier and to activate each of the presentation instruments that are associated with the group identifier for the predetermined activation amount; and wherein the host computer system is further configured to associate a batch number with the package arrangement that was generated contemporaneous with or subsequent to transmitting the package identifier to the host computer system and to transmit to the point of sale device the batch number to initiate a void procedure to void the activation.

9. The system as in claim 8, wherein the account identifier and the associated presentation instrument identifiers are the same.

10. The system as in claim 8, wherein the host computer system includes an activation amount that is associated with each of the account identifiers, and wherein the host computer system is configured to receive a purchase amount for the package arrangement and to activate the associated presentation instruments if the activation amount equals the purchase amount for all of the account identifiers associated with the package.

11. The system as in claim 10, wherein at least some of the activation amounts are different from each other.

12. The system as in claim 8, further comprising at least one point of sale device that is configured to read the package identifier and to transmit the package identifier to the host computer system.

13. The system as in claim 12, wherein the point of sale device includes a reader selected from a group consisting of a bar code reader, a magnetic stripe reader and an RF reader.

14. The system as in claim 8, further comprising at least one point of sale device that is configured to read the presentation instrument identifier from the presentation instrument and to transmit the presentation instrument identifier to the host computer system.

15. The system as in claim 8, wherein the presentation instruments comprise plastic cards and wherein the account identifiers are stored on media selected from a group consisting of bar codes, magnetic stripes and RF chips.

16. The system as in claim 8, wherein the packaging material is selected from a group consisting of shrink wrap, card board and paper, and wherein the package identifier is stored on media selected from a group consisting of bar codes and RF chips.

17. The system as in claim 8, wherein the host computer system is configured to receive one of the presentation instrument identifiers along with a requested redemption amount and to reduce the activation amount by the redemption amount.

18. A method of activating a plurality of gift cards, said method comprising:

providing a package of multiple presentation instruments, wherein each presentation instrument includes a unique presentation instrument identifier used to associate funds with the presentation instrument such that each presentation instrument has a separate independent account, yet is processed by a common processor, wherein each separate account may be activated for a predetermined activation amount, wherein the presentation instrument identifiers and associated account values are stored within a database of a host computer system prior to activation of any of the accounts, and wherein the package includes a package identifier, and each such presentation instrument identifier is associated with the package identifier;

reading the package identifier from the package and transmitting the package identifier over an electronic network to the host computer system;

generating a batch number contemporaneous with or subsequent to transmitting the package identifier to the host computer system;

associating the batch number with the package of presentation instruments at the host computer system;

evaluating the package identifier at the host computer system to determine whether the package identifier is valid; and activating at the host computer system each of the presentation instruments in the package for the activation amount based on the package identifier that was read from the package.

* * * * *